Oct. 13, 1959

C. L. C. CHAPMAN 2,908,740

ELECTRODE BEARING CURRENT-CONDUCTING
NETWORK AND METHOD OF PRODUCING SAME

Original Filed June 25, 1952

INVENTOR:
CHRISTOPHER L.C. CHAPMAN
BY
Karl F. Ross
AGENT

United States Patent Office 2,908,740
Patented Oct. 13, 1959

2,908,740

ELECTRODE BEARING CURRENT-CONDUCTING NETWORK AND METHOD OF PRODUCING SAME

Christopher L. C. Chapman, Sutton, England, assignor to Yardney International Corp., New York, N.Y., a corporation of New York Original application June 25, 1952, Serial No. 295,454, now Patent No. 2,776,331, dated January 1, 1957. Divided and this application October 26, 1956, Serial No. 618,545

Claims priority, application Great Britain July 16, 1951

5 Claims. (Cl. 136—20)

The present invention relates to the manufacture of electrodes for electric batteries, rechargeable or primary, and concerns more particularly electrodes of the type which are made of compressed powders, preferably sintered. This application is a division of U.S. application Serial No. 295,454, filed June 25, 1952, now U.S. Patent No. 2,776,331 issued January 1, 1957.

It is customary in such plates to provide means, such as a projecting lug or tab, for connecting the pressed powder of the plate to the terminal of the battery in which the plate is used. Moreover, it is generally desirable to provide a current-conductive network or grid on or in the plate in order to afford a low-resistance path between the terminal lug or tab and the various portions of the electrode, the active material of which may be, at least during certain stages of the operating cycle, in a relatively poorly conducting state.

It has been customary heretofore to produce the desired result by imbedding in the powdered material a grid, mesh or gauze of wires or strips of a highly conducting metal, the electrochemically active powder being pressed around the grid or the like and subsequently subjected to a sintering operation. An extension of the embedded network, not necessarily covered itself with the sintered powder, may form the terminal lug or tab.

One of the disadvantages of the well-known methods and arrangements outlined hereinabove resides in the fact that wire strips, gauze or grids add considerably to the weight of the finished plate and also increase the cost of production thereof. There is also the danger that the active material of the complete electrode plate may become loosened or detached from the current-distributing network as a result of mechanical shocks and of the chemical processes taking place during the use of the battery. Moreover, the configuration of the current- distributing network, if it is to be produced in a practical and economic manner, is subject to definite limitations which may not always be compatible with maximum electrical efficiency.

The present invention has for its object to provide a novel type of sintered plate incorporating a current-distributing network which avoids the disadvantages set out above, as well as a method of producing such network.

According to the invention, there is provided a method of forming a current-distributing network on a plate of sintered material by densifying selected, intercommunicating strip portions on at least the surface of the plate, on either or both sides thereof, including, preferably, a lug or extension of the plate forming a terminal connection. This selective densification is accomplished by depositing metal, preferably electrolytically, upon said selected portions. The electrochemically or otherwise deposited metal may be chemically identical with the sintered base material or, if desired, may be different, i.e. more highly conductive, provided objectionable electrochemical local couples between two dissimilar materials can be avoided.

The invention is particularly applicable to sintered-silver battery electrodes.

The invention will be described in detail with reference to the accompanying drawing in which:

Fig. 2 shows a shield or fixture adapted to be used in electrolytically forming the network referred to;

Figure 1:
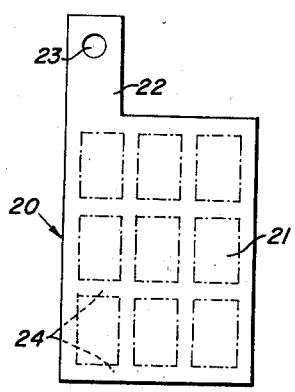
Fig. 1 is an elevational view of a sintered electrode to be provided with a current-distributing network in accordance with the invention.

The plate 20, Fig. 1, consists of sintered electrode material, e.g. silver, and comprises a body portion 21 and a lug portion 22, the latter having a hole 23 to receive a terminal screw. Indicated in dot-dash lines is the current distribution network 24 which it is desired to produce on at least one of the faces of the plate 20.

Figure 2:
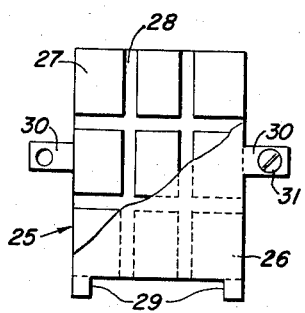
Figure 3:
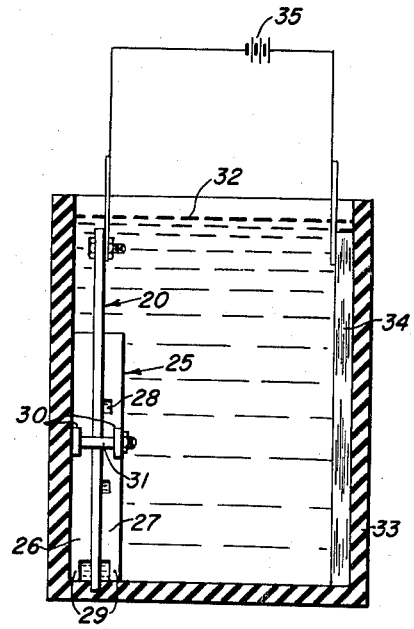
Fig. 3 shows an electrolytic circuit for treating the electrode of Fig. 1, using the shield of Fig. 2.

A shield 25 of electrochemically inert material, Fig. 2, is adapted to be clamped or otherwise attached to the plate 20 for the purpose of masking major portions thereof while exposing interconnecting strip portions to the action of a suitable plating bath. As here shown the shield comprises a solid rear plate 26 of rectangular configuration, whose size is such as to cover all but a marginal area of the body portion 21 of the electrode plate 20, and a coextensive front plate 27 provided with intersecting, horizontal and vertical grooves or channels 28 designed to afford the electrolyte access to selected portions of the electrode plate 20 when the same is received by the shield 25. The shield plates 26, 27 are supported on legs 29 and have lugs 30 adapted to be engaged by countersunk bolts 31, whereby the electrode plate 20 can be clamped between the shield plates as shown in Fig. 3.

In the latter figure the plate 20, sandwiched between the plates 26, 27, is shown immersed in a suitable plating solution 32 contained in a vessel 33, there being present in this solution a plate 34 serving as an anode and connected to the cathode 20 through a source of current 35. The plate 34 may consist of solid metal chemically identical with the sintered material, such as (in the example assumed) silver.

The solid rear plate 26 of the shield 25 could, of course, be replaced by a channeled one, identical with plate 27, if plating of the network unto both electrode faces is desired.

Figure 4:
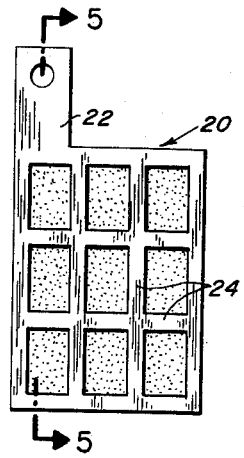
Fig. 4 is a view similar to Fig. 1 showing the finished electrode.
Figure 5:
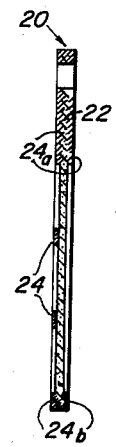
Fig. 5 is a section on the line 5—5 of Fig. 4.

The finished plate 20, with the network 24 plated onto one side thereof, is shown in Figs. 4 and 5. It will be noted that the lug portion 22, which has been fully exposed to the plating solution 32, is coated on both sides with the electrolytically deposited material, as indicated at 24a, and the marginal areas 24b are likewise so coated; all of these coatings 24, 24a, 24b, whose thickness has been exaggerated in Fig. 5, are interconnected. Fig. 5 also shows how the coating penetrates into the sintered material whereby the latter becomes densified to a certain depth.

The shield 25 (with suitable adaptations) may, of course, be utilized for depositing the desired metal layer by different means, e.g. spraying.

It will thus be seen that there has been disclosed a method of producing in an efficient and inexpensive manner one or more electrode plates of the character set forth wherein the spongy active portions and the highly conductive network, as well as the terminal lug forming an extension of said network, are firmly and securely anchored to one another.

In contradistinction to mechanical compression processes for densification which is the major subject of the parent application, now U.S. Patent 2,776,331, it should be pointed out that the present process yields electrodes with conductive networks substantially flush with or slightly raised above the major active electrode surface.

The resulting plate is of light weight and low volume, compared with equivalent plates incorporating wires, grids or the like, and its network may have any desirable configuration. Inasmuch as only the shape of the indefinitely re-usable shield has to be altered, substantially greater flexibility in design is thereby afforded.

The invention is, of course, not limited to the specific embodiments shown and described, some of whose features may be readily changed in form or otherwise modified without thereby departing from the spirit and scope of the appended claims.

I claim:

1. A method of producing a battery electrode from powdered electrochemically active material which comprises the steps of forming said material into a porous body and providing a current-conducting network by electrochemically depositing a highly conductive material on selected surface portions of said body while leaving major parts of said surface free from said conductive material.

2. The method according to claim 1, wherein the current-conductive network is maintained substantially flush with the surface of said porous body.

3. The method of producing a battery electrode from powdered electrochemically active metal powders which comprises the steps of forming said material into an electrode body, sintering said body and electrochemically depositing on the surface of said body a highly conductive material constituting a current-conducting network while leaving major parts of said surface free from said conductive material.

4. The method of producing a battery electrode which comprises the steps of forming an electrode body from silver powder, sintering said body and electrochemically depositing a dense silver current-conducting network on the surface of said body while leaving major parts of said surface exposed by said network.

5. The method of producing a battery electrode which comprises the step of electrochemically depositing dense silver strips, interconnected and spaced to provide a current-conducting network, on the surface of a sintered-silver electrode blank, the spaces between said strips leaving major parts of said surface exposed.

References Cited in the file of this patent

UNITED STATES PATENTS

| | | |
|---|---|---|
| 585,853 | Samuels | July 6, 1897 |
| 1,940,385 | Ackermann | Dec. 19, 1933 |
| 2,361,378 | Brennan | Oct. 31, 1944 |
| 2,615,930 | Moulton | Oct. 28, 1952 |
| 2,776,331 | Chapman | Jan. 1, 1957 |
| 2,818,462 | Solomon | Dec. 31, 1957 |